United States Patent
Oomori et al.

(12) 
(10) Patent No.: US 6,490,348 B1
(45) Date of Patent: Dec. 3, 2002

(54) SWITCHING SYSTEM FOR PROVIDING AN IMPROVED CALL WAITING SERVICE

(75) Inventors: Wataru Oomori, Sendai (JP); Masahiko Yamagishi, Sendai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/362,800

(22) Filed: Jul. 28, 1999

(30) Foreign Application Priority Data

Jan. 19, 1999 (JP) .......................................... 11-011095

(51) Int. Cl.[7] ................................................ H04M 3/42
(52) U.S. Cl. ............................. 379/215.01; 379/207.04
(58) Field of Search ............ 379/215.01, 201.01–201.5, 379/207.02, 207.04, 207.05, 207.06, 207.07, 211.01, 211.02, 213.01, 208.01; 370/259; 455/415

(56) References Cited

U.S. PATENT DOCUMENTS

| | | | | |
|---|---|---|---|---|
| 5,363,429 A | * | 11/1994 | Fujisawa | 379/215.01 |
| 5,604,796 A | * | 2/1997 | Yamazaki | 379/213.01 |
| 5,812,656 A | * | 9/1998 | Garland et al. | 379/208.01 |
| 5,848,142 A | * | 12/1998 | Yaker | 379/215.01 |
| 5,999,613 A | * | 12/1999 | Nabkel et al. | 379/142.04 |
| 6,144,644 A | * | 11/2000 | Bajzath et al. | 370/259 |

FOREIGN PATENT DOCUMENTS

| | | |
|---|---|---|
| JP | 56-20367 | 2/1981 |
| JP | 9-270855 | 10/1997 |

* cited by examiner

Primary Examiner—Ahmad F. Matar
Assistant Examiner—Benny Q. Tieu
(74) Attorney, Agent, or Firm—Katten Muchin Zavis Rosenman (57) ABSTRACT

A switching system includes an interrupt notification unit which enables a first telephone, when a dial tone is being sent to the first telephone prior to dialing of a phone number of a second telephone, to notify its user of an incoming call from a third telephone. An interrupt call control unit enables a connection between the first telephone and the third telephone to be established when a predetermined number for accepting the incoming call is dialed on the first telephone after the notification of the incoming call.

14 Claims, 9 Drawing Sheets

34 — SM PARAMETERS

| PHONES | REGISTRATION |
|---|---|
| 10 | YES |
| 20 | NO |
| 30 | NO |
| ⋮ | ⋮ |

FIG.3B

35 — OM PARAMETERS

| PHONES | OPERATION CONDITION | CSM PARA ID |
|---|---|---|
| 10 | CALLING | 36a |
| 20 | CALLED | ⋮ |
| 30 | CALLING | 36b |
| ⋮ | IDLE | ⋮ |

FIG.3C

36a — CSM PARAMETERS

| CALLING PHONE | 10 |
|---|---|
| CALLED PHONE | 20 |
| INTERRUPT PHONE | 30 |
| ANNOUNCEMENT | ⋮ |
| CALL STATE NO. | 3 |

36b — CSM PARAMETERS

| CALLING PHONE | 30 |
|---|---|
| CALLED PHONE | 10 |
| INTERRUPT PHONE | ⋮ |
| ANNOUNCEMENT | ⋮ |
| CALL STATE NO. | ⋮ |

SWITCHING SYSTEM FOR PROVIDING AN IMPROVED CALL WAITING SERVICE

BACKGROUND OF THE INVENTION

(1) Field of the Invention

The present invention relates to a switching system which provides a call waiting service for a terminal equipment.

The call waiting service, provided by a switching system, enables a terminal equipment, which is already active in a communication, to notify its user of an incoming call from a third party. The switching system of this type acts to interrupt the existing communication and establish a connection between the terminal equipment and the third party's terminal equipment.

(2) Description of the Related Art

As disclosed in Japanese Laid-Open Patent Application No. 9-270855, a switching system which provides a call waiting service for telephones is known. Suppose that a conventional switching system of this type interconnects a first telephone, a second telephone and a third telephone through circuit switching. When the first telephone is already active to start communication or talk with the second telephone and an incoming call from the third telephone to the first telephone occurs, the conventional switching system acts to enable the first telephone to notify its user, at a start of the communication or talk, of the incoming call from the third telephone. Further, when the first telephone is placed in an on-hook condition after the notification of the incoming call, the conventional switching system acts to establish a connection between the first telephone and the third telephone, so as to allow the user of the first telephone to communicate with a user of the third telephone.

In the above-described switching system, an incoming call from a third party is notified to the user of the first telephone at the start of the talk with the second telephone. The user of the third telephone has to wait for a reply from the first telephone until the talk with the second telephone starts and then the user takes any action. In other words, the third party will not have an answer from the first telephone so long as the communication between the first telephone and the second telephone does not start. This has been inconvenient to the user of the third telephone.

Further, in a case of an incoming call from the third telephone to the first telephone occurring in the above-described switching system when the switching system is in a state that a ringing tone is being sent to the first telephone while a ring-back tone is being sent to the second telephone after a phone number of the first telephone is dialed on the second telephone. In this case, it is impossible for the above-described switching system to provide the call waiting service for the first telephone. The user of the third telephone has to redial the number to call the first telephone again after the communication between the first telephone and the second telephone is terminated. This has been inconvenient to the user of the third telephone.

SUMMARY OF THE INVENTION

An object of the present invention is to provide an improved switching system in which the above-mentioned problems are eliminated.

Another object of the present invention is to provide a switching system which provides an improved call waiting service for a terminal equipment and is effective in speedily processing the notification of an incoming call from a third party to a user of the terminal equipment.

Still another object of the present invention is to provide a switching system which provides an improved call waiting service for a terminal equipment even when a ringing tone is being sent to the terminal equipment after the phone number of the terminal equipment is dialed on a second terminal equipment, and which is effective in speedily processing the notification of an incoming call from a third party to a user of the terminal equipment.

The above-mentioned objects of the present invention are achieved by a switching system which interconnects a first telephone, a second telephone and a third telephone through circuit switching, the switching system including: an interrupt notification unit which enables the first telephone, when a dial tone is being sent to the first telephone prior to dialing of a phone number of the second telephone, to notify its user of an incoming call from the third telephone; and an interrupt call control unit which enables a connection between the first telephone and the third telephone to be established when a predetermined number for accepting the incoming call is dialed on the first telephone after the notification of the incoming call.

The above-mentioned objects of the present invention are achieved by a switching system which interconnects a first telephone, a second telephone and a third telephone through circuit switching, the switching system including: an interrupt notification unit which enables the first telephone, when a phone number of the second telephone is being dialed on the first telephone, to notify its user, at an end of the dialing, of an incoming call from the third telephone; and an interrupt call control unit which enables a connection between the first telephone and the third telephone to be established when the first telephone is placed in an on-hook condition after the notification of the incoming call.

The above-mentioned objects of the present invention are achieved by a switching system which interconnects a first telephone, a second telephone and a third telephone through circuit switching, the switching system including: an interrupt notification unit which enables the first telephone, when a ring-back tone is being sent to the first telephone after a phone number of the second telephone is dialed on the first telephone, to notify its user of an incoming call from the third telephone; and an interrupt call control unit which enables a connection between the first telephone and the third telephone to be established when the first telephone is placed in an on-hook condition after the notification of the incoming call.

The above-mentioned objects of the present invention are achieved by a switching system which interconnects a first telephone, a second telephone and a third telephone through circuit switching, the switching system including: an interrupt detection unit which detects an incoming call from the third telephone to the first telephone when a ringing tone is being sent to the first telephone while a ring-back tone is being sent to the second telephone after a phone number of the first telephone is dialed on the second telephone; and an interrupt notification unit which enables the first telephone, which is active in a communication with the second telephone by placing the first telephone into an off-hook condition in response to the ringing tone, to notify its user, at a start of the communication, of the incoming call from the third telephone.

In a preferred embodiment of the switching system of the present invention, when a dial tone is being sent to the first telephone prior to dialing of a phone number of the second telephone and an incoming call from the third telephone occurs, the notification of the incoming call from the third telephone can be speedily made to the user of the first telephone. Further, the switching system of the present invention acts to establish a connection between the first telephone and the third telephone when a predetermined number for accepting the incoming call is dialed on the first telephone after the notification of the incoming call. Hence, the switching system of the present invention is effective in providing an increased convenience to the user of the third telephone.

In a preferred embodiment of the switching system of the present invention, when a phone number of the second telephone is being dialed on the first telephone and an incoming call from the third telephone occurs, the notification of the incoming call can be speedily made to the user of the first telephone at the end of the dialing. Further, the switching system of the present invention acts to establish a connection between the first telephone and the third telephone when the first telephone is placed in an on-hook condition after the notification of the incoming call. Hence, the switching system of the present invention is effective in providing an increased convenience to the user of the third telephone.

In a preferred embodiment of the switching system of the present invention, when a ring-back tone is being sent to the first telephone after a phone number of the second telephone is dialed on the first telephone and an incoming call from the third telephone occurs, the notification of the incoming call can be speedily made to the user of the first telephone. Further, the switching system of the present invention acts to establish a connection between the first telephone and the third telephone when the first telephone is placed in an on-hook condition after the notification of the incoming call. Hence, the switching system of the present invention is effective in providing an increased convenience to the user of the third telephone.

In a preferred embodiment of the switching system of the present invention, an incoming call from the third telephone to the first telephone is detected when a ringing tone is being sent to the first telephone while a ring-back tone is being sent to the second telephone after a phone number of the first telephone is dialed on the second telephone. Further, the switching system of the present invention enables the first telephone, which is active in a communication with the second telephone by placing the first telephone into an off-hook condition in response to the ringing tone, to notify its user, at a start of the communication, of the incoming call from the third telephone. Hence, the switching system of the present invention is effective in providing an increased convenience to the user of the third telephone.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENT

Before explaining the preferred embodiment of the present invention, a description will be given of the basic configuration of the switching system of the present invention with reference to FIG. 1, in order to facilitate understanding of the principles of the present invention.

Figure 1:
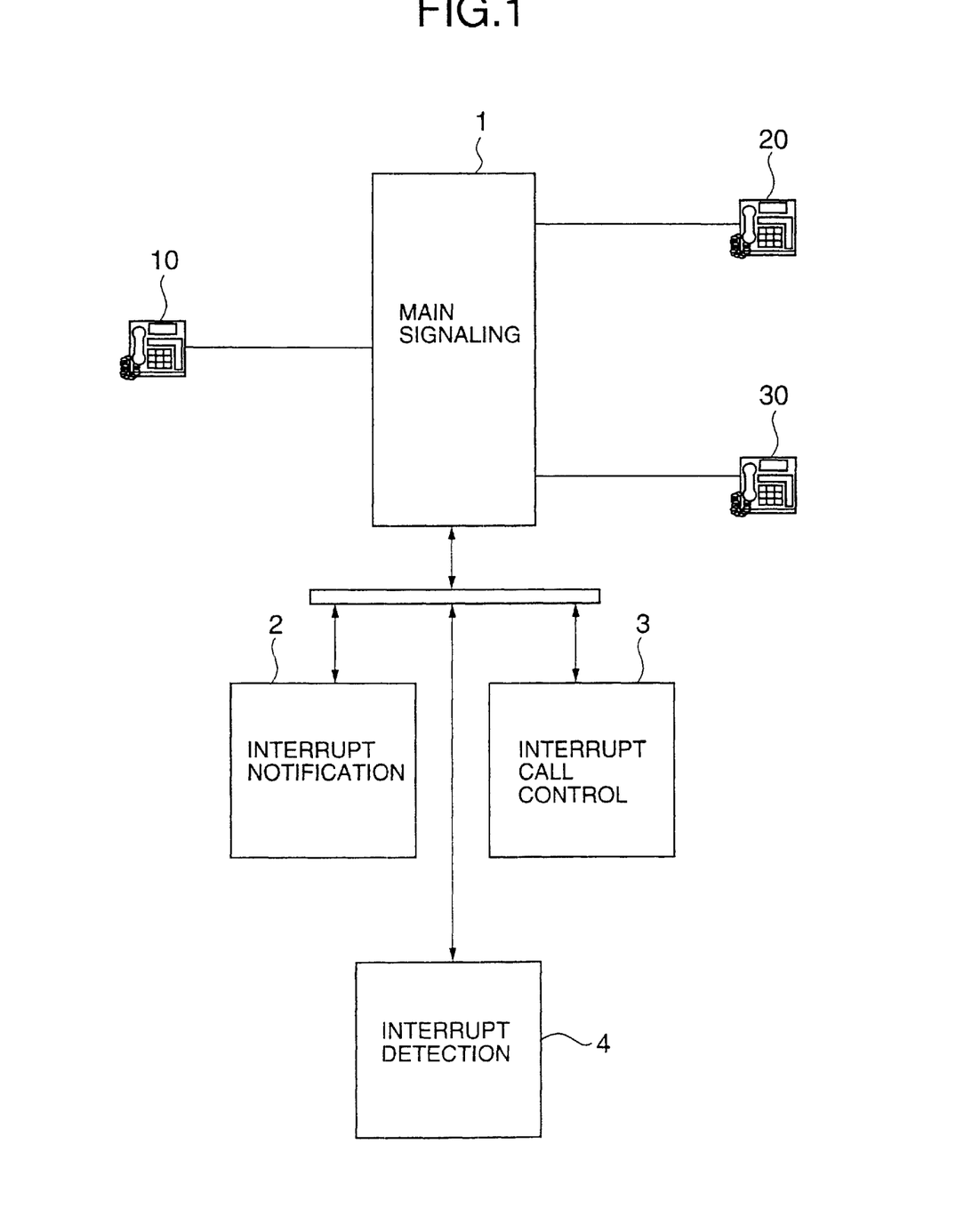
FIG. 1 is a diagram for explaining a basic configuration of a switching system of the present invention.

FIG. 1 shows a basic configuration of the switching system of the present invention.

As shown in FIG. 1, the switching system of the present invention generally has a main signaling circuit 1 which interconnects a first telephone 10, a second telephone 20 and a third telephone 30 via circuit switching. The switching system of the present invention includes at least an interrupt notification unit 2 and an interrupt call control unit 3. These units 2 and 3 are connected to the main signaling circuit 1 via a bus.

When a dial tone is being sent to the first telephone 10 prior to dialing of a phone number of the second telephone 20 and an incoming call from the third telephone 30 occurs, the interrupt notification unit 2 enables the first telephone 10 to notify its user of the incoming call from the third telephone 30. The interrupt call control unit 3 enables a connection between the first telephone 10 and the third telephone 30 to be established when a predetermined number for accepting the incoming call is dialed on the first telephone 10 after the notification of the incoming call.

In the above-described switching system of the present invention, when a dial tone is being sent to the first telephone 10 prior to dialing of the phone number of the second telephone 20, the notification of the incoming call from the third telephone 30 can be speedily made to the user of the first telephone 10. Further, the above-described switching system of the present invention acts to establish a connection between the first telephone 10 and the third telephone 30 when the predetermined number for accepting the incoming call is dialed on the first telephone 10 after the notification of the incoming call. Hence, the switching system of the present invention is effective in providing an increased convenience to the user of the third telephone 30.

Further, in the above-described switching system of FIG. 1, when the phone number of the second telephone 20 is being dialed on the first telephone 10 and an incoming call from the third telephone 30 occurs in the main signaling circuit 1, the interrupt notification unit 2 enables the first telephone 10 to notify its user, at an end of the dialing, of the incoming call from the third telephone 30. The interrupt call control unit 3 enables a connection between the first telephone 10 and the third telephone 30 to be established when the first telephone 10 is placed in an on-hook condition after the notification of the incoming call.

In the above-described switching system of the present invention, when the phone number of the second telephone 20 is being dialed on the first telephone 10, the notification of the incoming call can be speedily made to the user of the first telephone 10 at the end of the dialing. Further, the above-described switching system of the present invention acts to establish a connection between the first telephone 10 and the third telephone 30 when the first telephone 10 is placed in an on-hook condition after the notification of the incoming call. Hence, the switching system of the present invention is effective in providing an increased convenience to the user of the third telephone 30.

Further, in the above-described switching system of FIG. 1, when a ring-back tone is being sent to the first telephone 10 after the phone number of the second telephone 20 is dialed on the first telephone 10 and an incoming call from the third telephone 30 occurs, the interrupt notification unit 2 enables the first telephone 10 to notify the user of the incoming call from the third telephone 30. The interrupt call control unit 3 enables a connection between the first telephone 10 and the third telephone 30 to be established when the first telephone 10 is placed in an on-hook condition after the notification of the incoming call.

In the above-described switching system of the present invention, when a ring-back tone is being sent to the first telephone 10 after the phone number of the second telephone 20 is dialed on the first telephone 10, the notification of the incoming call can be speedily made to the user of the first telephone 10. Further, the above-described switching system of the present invention acts to establish a connection between the first telephone 10 and the third telephone 30 when the first telephone 10 is placed in an on-hook condition after the notification of the incoming call. Hence, the switching system of the present invention is effective in providing an increased convenience to the user of the third telephone.

Further, the above-described switching system of FIG. 1 further includes an interrupt detection unit 4, in addition to the interrupt notification unit 2 and the interrupt call control unit 3. The interrupt detection unit 4 is connected to the main signaling circuit 1 via the bus. When a ringing tone is being sent to the first telephone 10 while a ring-back tone is being sent to the second telephone 20 after a phone number of the first telephone 10 is dialed on the second telephone 20 and during this state an incoming call from the third telephone 30 to the first telephone 10 occurs in the main signaling circuit 1, the interrupt detection unit 4 detects the incoming call from the third telephone 30 to the first telephone 10. The interrupt notification unit 2 enables the first telephone 10, which is active in a communication with the second telephone 20 by placing the first telephone 10 into an off-hook condition in response to the ringing tone, to notify the user, at a start of the communication, of the incoming call from the third telephone 30.

In the above-described switching system of the present invention, the incoming call from the third telephone 30 to the first telephone 10 is detected when the ringing tone is being sent to the first telephone 10 while the ring-back tone is being sent to the second telephone 20 after the phone number of the first telephone 10 is dialed on the second telephone 20. Further, the above-described switching system of the present invention enables the first telephone 10, which is active in a communication with the second telephone 20 by placing the first telephone 10 into an off-hook condition in response to the ringing tone, to notify the user, at the start of the communication, of the incoming call from the third telephone 30. Hence, the switching system of the present invention is further effective in providing an increased convenience to the user of the third telephone 30.

A description will now be given of the preferred embodiment of the present invention with reference to the accompanying drawings.

Figure 2:
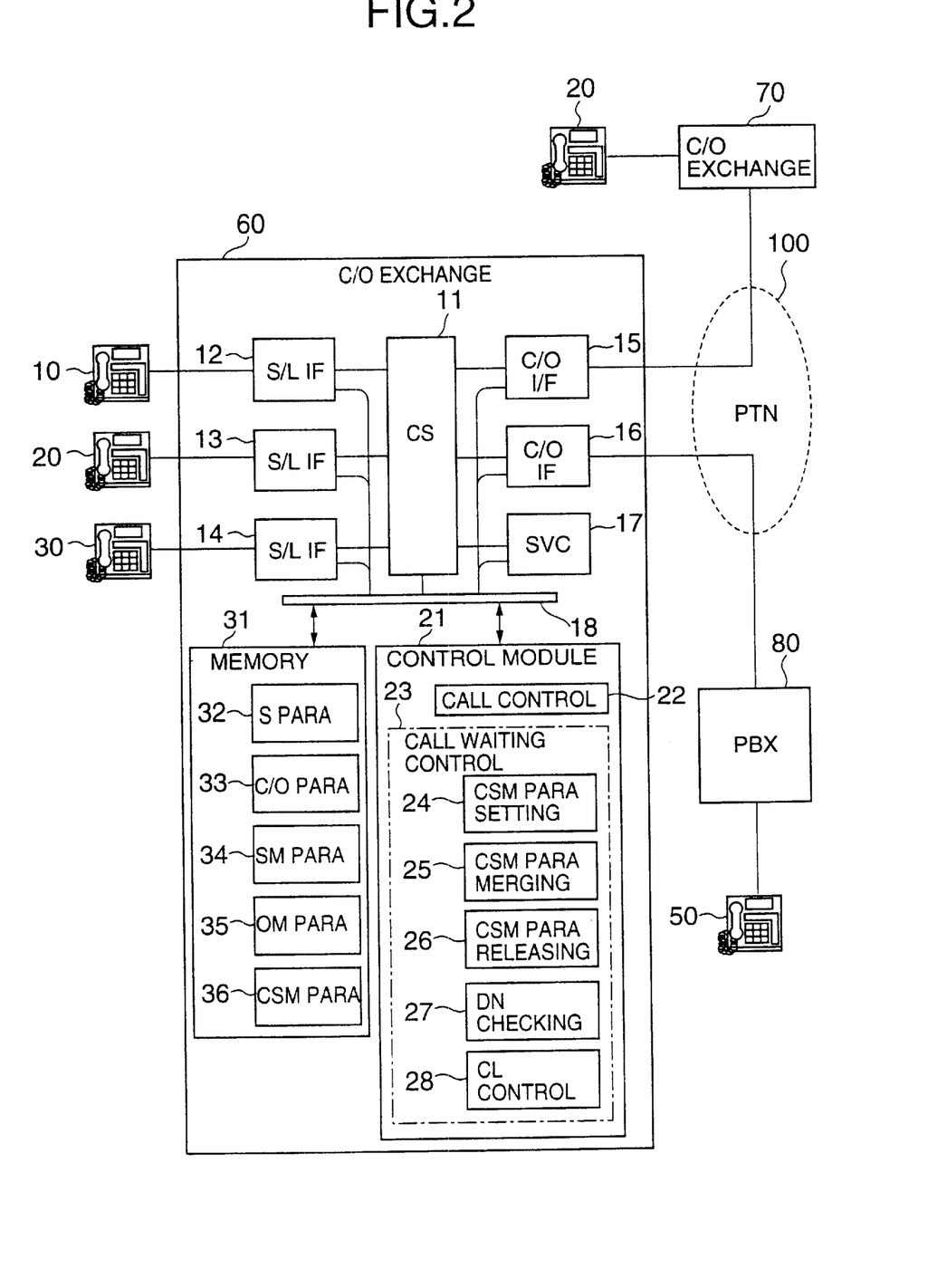
FIG. 2 is a diagram of a switching system embodying the present invention.

FIG. 2 shows a switching system embodying the present invention. In FIG. 2, a central office (C/O) exchange 60 with a number of telephones 10, 20 and 30 attached thereto, a central office (C/O) exchange 70 with a telephone 40 attached thereto, and a private branch exchange (PBX) 80 with a telephone 50 attached thereto are linked together via a public telecommunications network (PTN) 100. The switching system embodying the present invention is incorporated in the C/O exchange 60, and the C/O exchange 60 is adapted to provide an improved call waiting service as described above with reference to FIG. 1.

As shown in FIG. 2, the C/O exchange 60 includes a channel switch (CS) 11. The telephones 10, 20 and 30 are connected through subscriber line interfaces (S/L IF) 12, 13 and 14 to the CS 11 of the C/O exchange 60. A central office (C/O) trunk 15 is linked to the external C/O exchange 70 via the PTN 100. A central office (C/O) trunk 16 is linked to the external PBX 80 via the PTN 100. In the C/O exchange 60, the C/O trunks 15 and 16 are connected to the CS 11, and a service (SVC) trunk 17 is connected to the CS 11. The SVC trunk 17 provides various service functions needed for telecommunications, such as dial tone sending, push-button signal receiving, ring-back tone sending, ring-back tone sending, busy tone sending, and announcement message sending. The elements of the C/O exchange 60 are interconnected by a common bus 18.

The C/O exchange 60 includes a control module 21 connected to the common bus 18. The control module 21 is comprised of a central processing unit (CPU). The elements of the control module 21 are achieved by execution of a program by the CPU. The control module 21 includes a call control unit 22 and a call waiting control unit 23. The call control unit 22 carries out basic call control processing. The call waiting control unit 23 carries out call waiting control processing which relates to the improved call waiting service of the present invention.

In the control module 21, the call waiting control unit 23 generally has a call-state management parameter (CSM PARA) setting block 24, a call-state management parameter (CSM PARA) merging block 25, a call-state management parameter (CSM PARA) releasing block 26, a dialed-number (DN) checking block 27, and a line connection (LC) control block 28. In the call waiting control unit 23, the call-state management parameters (CSM PARA) are generated based on the call waiting control processing. The call-state management parameter setting block 24 performs setting of the call-state management parameters (CSM PARA) to be stored. The CSM PARA merging block 25 merges the calling telephone ID of a call-state management parameter related to an interrupt call of a third party, into the interrupt telephone ID of a call-state management parameter related to the existing call of the related telephone.

Further, in the call waiting control unit 23, the call-state management (CSM) parameter releasing block 26 releases the call-state management parameter related to the interrupt call after the merging. The dialed-number (DN) checking block 27 recognizes that a key-input data (for example, a combination of "*", "#" and ten keys "0"–"9") which is dialed on the related one of the telephones 10–30 matches with a predetermined number after it is notified of an incoming call from a third party. The line connection (LC) control block 28 controls a connection of a call-waiting-related path to the related one of the telephones 10, 20 and 30 based on the related call-state management parameter.

The C/O exchange 60 includes a memory 31 connected to the common bus 18. The memory 31 is comprised of a RAM, a ROM or the like. In the memory 31, the program executed by the CPU 21 is stored. Further, there are provided in the memory 31 a subscriber parameter area 32 in which subscriber parameters (S PARA) are stored, a central office parameter area 33 in which central office parameters (C/O PARA) are stored, a service management parameter area 34 in which service management parameters (SM PARA) are stored, an operation management parameter area 35 in which operation management parameters (OM PARA) are stored, and a call-state management parameter area 36 in which call-state management parameters (CSM PARA) are stored.

The service management parameters (SM PARA) in the memory area 34 are to indicate whether the supply of the call waiting service for the respective telephones 10–30 is registered in the exchange 60. The operation management parameters (OM PARA) in the memory area 35 are to indicate an operating condition of the related one of the telephones 10–30. The call-state management parameters (CSM PARA) in the memory area 36 are to indicate respective call states of the telephones 10–30.

Figure 3A:
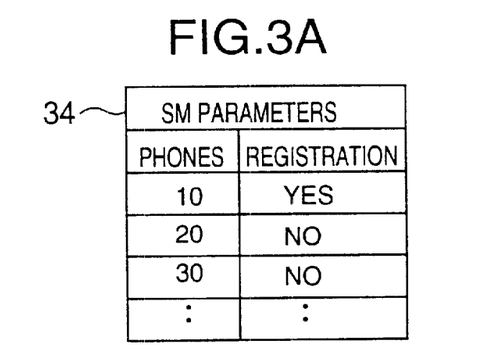
FIG. 3A, FIG. 3B and FIG. 3C are diagrams for explaining various management parameters used by the switching system of the present embodiment.
Figure 3B:
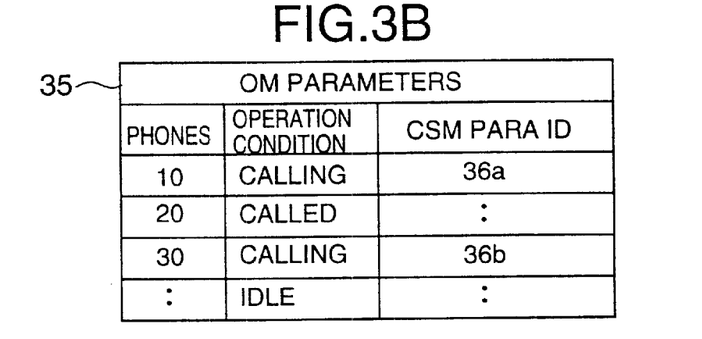
Figure 3C:
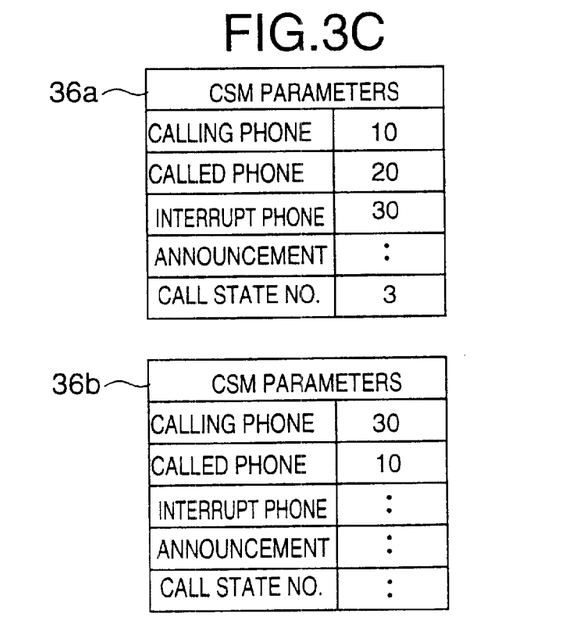

FIG. 3A, FIG. 3B and FIG. 3C show various management parameters used by the switching system of the present embodiment.

FIG. 3A shows an example of the service management (SM) parameters stored in the memory area 34. As shown in FIG. 3A, the SM parameters are allocated to the respective telephones 10–30, and indicate whether the supply of the call waiting service for the respective telephones 10–30 is registered in the C/O exchange 60. In the example of FIG. 3A, the supply of the call waiting service for only the telephone 10 is registered.

FIG. 3B shows an example of the operation management (OM) parameters stored in the memory area 35. As shown in FIG. 3B, the OM parameters are allocated to the respective telephones 10–30, and indicate an operating condition of the related one of the telephones 10–30. Also, each OM parameter includes a call-state management parameter identification (CSM PARA ID) of the related one of the telephones 10–30. Every time a call related to one of the telephones 10–30 occurs, a call-state management parameter (CSM PARA) is generated for the call. At that time, a CSM PARA ID indicating the location of that CSM PARA in the memory area 36 is also generated and inserted in the OM parameter for the related telephone. In the example of FIG. 3B, the CSM PARA ID "36a" is inserted in the OM parameter for the calling telephone 10, and the CSM PARA ID "36b" is inserted in the OM parameter for the calling telephone 30.

FIG. 3C shows examples of the callstate management (CSM) parameters stored in the memory area 36. As described above, every time a call related to one of the telephones 10–30 occurs, a callstate management parameter (CSM PARA) is generated for the call. Such CSM parameters are stored in the memory area 36. In the example of FIG. 3C, only the two CSM parameters "36a" and "36b" are stored. Each CSM PARA includes an identification of the calling telephone, an identification of the called telephone, an identification of the interrupt telephone (or the subsequently calling telephone), an identification of an announcement message (related to a notification of an incoming call from the interrupt telephone), and a call state number for the related call. The call state number indicates a specific one of a plurality of call states with respect to the call that has occurred.

As in the examples of FIG. 3C, when the second telephone 20 is called by the first telephone 10, the CSM PARA "36a" is generated and stored. The CSM PARA "36a" at that time includes only the calling telephone ID "10" and the called telephone ID "20". When the first telephone 10 is called by the third telephone 30, the CSM PARA "36b" is generated and stored. The CSM PARA "36b" at that time includes only the calling telephone ID "30" and the called telephone ID "10". Further, when the first telephone 10 is subsequently called by the third telephone 30, the interrupt telephone ID "30" and the call state number "3" are inserted in the CSM PARA "36a".

Figure 4:
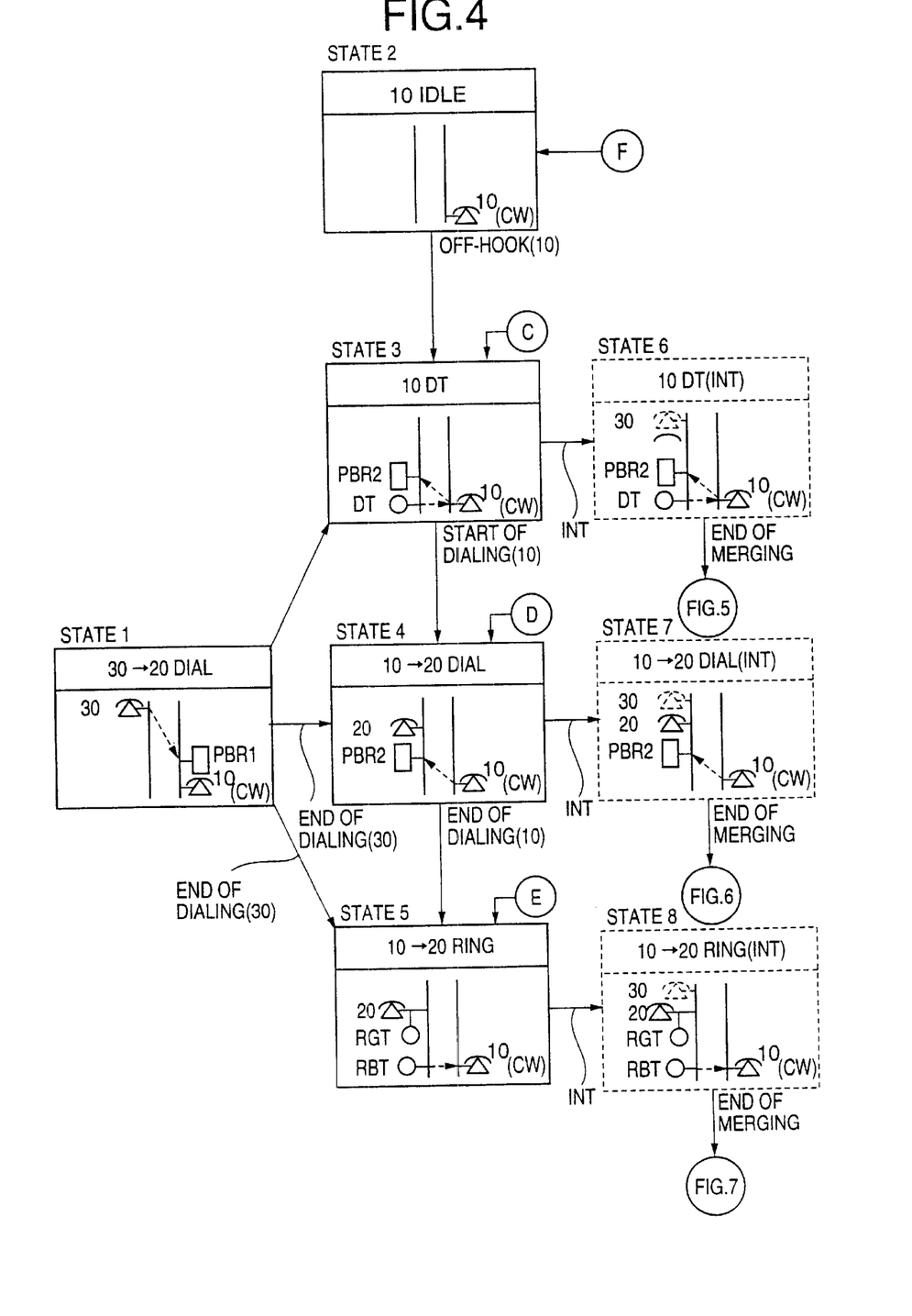
FIG. 4 is a diagram for explaining a state transition of the switching system of the present embodiment during execution of a call waiting process.

FIG. 4 shows a state transition of the switching system of the present embodiment during execution of a call waiting process. Specifically, a call control processing and a state transition of the C/O exchange 60 when the telephone 10 originates a call to the telephone 20 and an incoming call from the telephone 30 occurs, are illustrated in FIG. 4.

When the telephone 10 originates a call to the telephone 20 with no incoming call from the telephone 30, the C/O exchange 60 to which the switching system of the present embodiment is applied operates as follows. As shown in FIG. 4, the telephone 10 is initially in an idle condition (state 2). When the telephone 10 is placed in an off-hook condition, the C/O exchange 60 sends an audible dial tone (DT) to the telephone 10 so that the user of the telephone 10 hears the dial tone DT prior to dialing of the phone number of the telephone 20 (state 3).

The user of the telephone 10 starts dialing the phone number of the telephone 20 on the telephone 10 (state 4). In the state 4, a push-button receiver (PBR2) analyzes the dialed number of the destination input by the user on the telephone 10 in order to detect whether the dialing of the phone number of the telephone 20 on the telephone 10 is completed. When the dialing of the phone number of the telephone 20 is done on the telephone 10, the C/O exchange 60 sends a ringing tone (RGT) to the called telephone 20 and sends a ring-back tone (RBT) to the calling telephone 10 (state 5).

When an incoming call from the telephone 30 to the telephone 10 occurs subsequently to the calling of the telephone 20 by the telephone 10, the C/O exchange 60 to which the switching system of the present embodiment is applied operates as follows. As shown in FIG. 4, the phone number of the telephone 10 is dialed on the telephone 30 (state 1) so as to cause the incoming call from the telephone 30 to the telephone 10 to interrupt the calling of the telephone 20 by the telephone 10.

As previously described with reference to FIG. 1, the operations of the switching system of the present invention are controlled by the interrupt notification unit 2 and the interrupt call control unit 3 (or the CPU 21) in different manners depending on which of the state 3, the state 4 and the state 5 the C/O exchange 60 is set in when the dialing of the phone number of the telephone 10 on the telephone 30 is completed. More specifically, as indicated by the dotted lines in FIG. 4, when the completion of the dialing on the telephone 30 accords with the time the C/O exchange 60 is in the state 3, the C/O exchange 60 is set into state 6 through the call waiting process (INT). When the completion of the dialing on the telephone 30 accords with the time the C/O exchange 60 is in the state 4, the C/O exchange 60 is set into state 7 through the call waiting process (INT). Further, when the completion of the dialing on the telephone 30 accords with the time the C/O exchange 60 is in the state 5, the C/O exchange 60 is set into state 7 through the call waiting process (INT).

Before explaining the respective operations of the switching system of the present embodiment after the C/O exchange 60 is changed into each of the state 6, the state 7 and the state 8, a description will now be given of the call waiting process which is carried out by the CPU 21 of the C/O exchange 60 at the end of the dialing of the phone number of the telephone 10 on the telephone 30 for all the states 6, 7 and 8. See FIG. 5, FIG. 6 and FIG. 7 for the respective operations of the switching system of the present embodiment after the C/O exchange 60 is changed into each of the state 6, the state 7 and the state 8.

Figure 9:
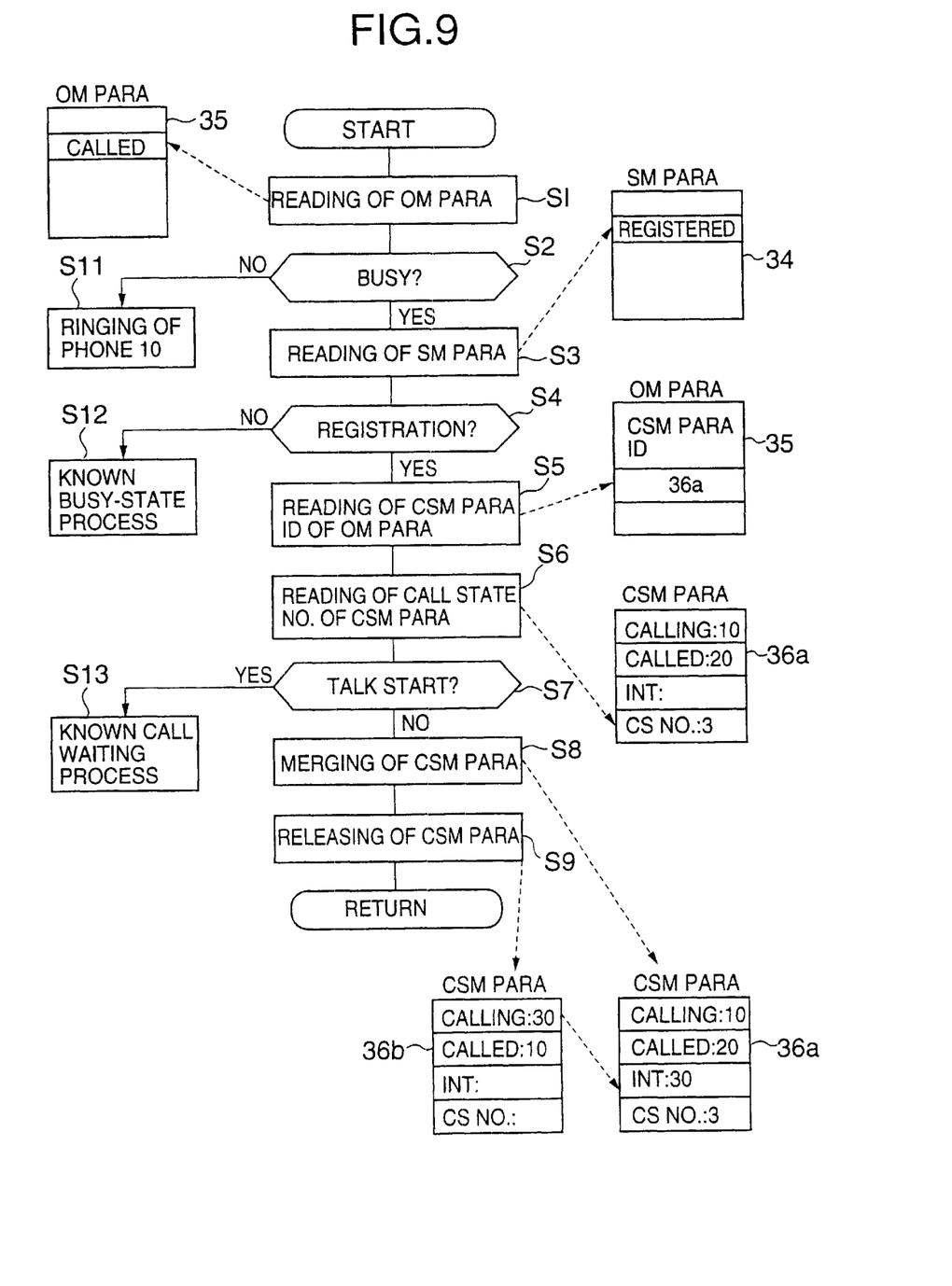
FIG. 9 is a flowchart for explaining a call waiting process executed by the switching system.

FIG. 9 shows a call waiting process executed by the switching system of the present embodiment. Suppose that, prior to the start of the call waiting process of FIG. 9, the dialing of the phone number of the telephone 10 on the telephone 30 is already completed. In the call control unit 22, a post-dialing event is issued in response to the end of the dialing on the telephone 30. In the call waiting control unit 23, the call waiting process (shown in FIG. 9) is started in response to the issue of the post-dialing event.

As shown in FIG. 9, at the start of the call waiting process, the CPU 21 at step S1 reads the operation management (OM) parameter (the operating condition of the called telephone 10) from the memory area 35 of the memory 31. The CPU 21 at step S2 determines whether the called telephone 10 is busy, based on the read OM parameter.

When the result at the step S2 is negative, it is determined that the called telephone 10 is not in use. The CPU 21 at step S11 sends a ringing tone to the telephone 10, which causes the telephone 10 to ring.

When the result at the step S2 is affirmative, it is determined that the called telephone 10 is busy. The CPU 21 at step S3 reads the service management (SM) parameter (the registration of the called telephone 10) from the memory area 34 of the memory 31. The CPU 21 at step S4 determines whether the supply of the call waiting service for the called telephone 10 is registered, based on the read SM parameter.

When the result at the step S4 is negative, it is determined that the supply of the call waiting service for the called telephone 10 is not registered. The CPU 21 at step S12 performs a known busy-state process on the telephone 10.

When the result at the step S4 is affirmative, it is determined that the supply of the call waiting service for the called telephone 10 is registered. The CPU 21 at step S5 reads out the callstate management parameter ID (CSM PARA ID) for the telephone 10 in the operation management (OM) parameter. In this case, the read-out CSM PARA ID is "36a" indicating the location of the CSM PARA in the memory area 36, as shown in FIG. 9. The CPU 21 at step S6 reads the call state number (for example, "3") of the CSM PARA from the memory area 36, the location of that CSM PARA in the memory area 36 being indicated by the CSM PARA ID read in the step S5. The CPU 21 at step S7 determines whether the communication or talk between the telephone 10 and the telephone 30 is started, based on the read call state number.

When the result at the step S7 is affirmative, it is determined that as the talk between the telephone 10 and the telephone 30 is started the known call waiting service should be provided by the C/O exchange 60. The CPU 21 at step S13 performs the known call waiting process for the telephones 10 and 30.

On the other hand, when the result at the step S7 is negative, it is determined that as the talk between the telephone 10 and the telephone 30 is not yet started the improved call waiting service of the present invention should be provided by the C/O exchange 60. The CPU 21 at step S8 enables the CSM PARA merging block 25 to perform the merging such that the calling telephone ID (in this case, "30") of the call-state management parameter (CSM PARA) of the memory area 36b related to the interrupt call of the telephone 30 is read, and the calling telephone ID ("30") is inserted into the interrupt telephone ID of the call-state management parameter (CSM PARA) of the memory area 36a related to the existing call of the telephone 10. The CPU 21 at step S9 enables the CSM PARA releasing block 26 to perform the releasing such that the call-state management parameter of the memory area 36b is released after the merging of the call-state management parameter.

Figure 5:
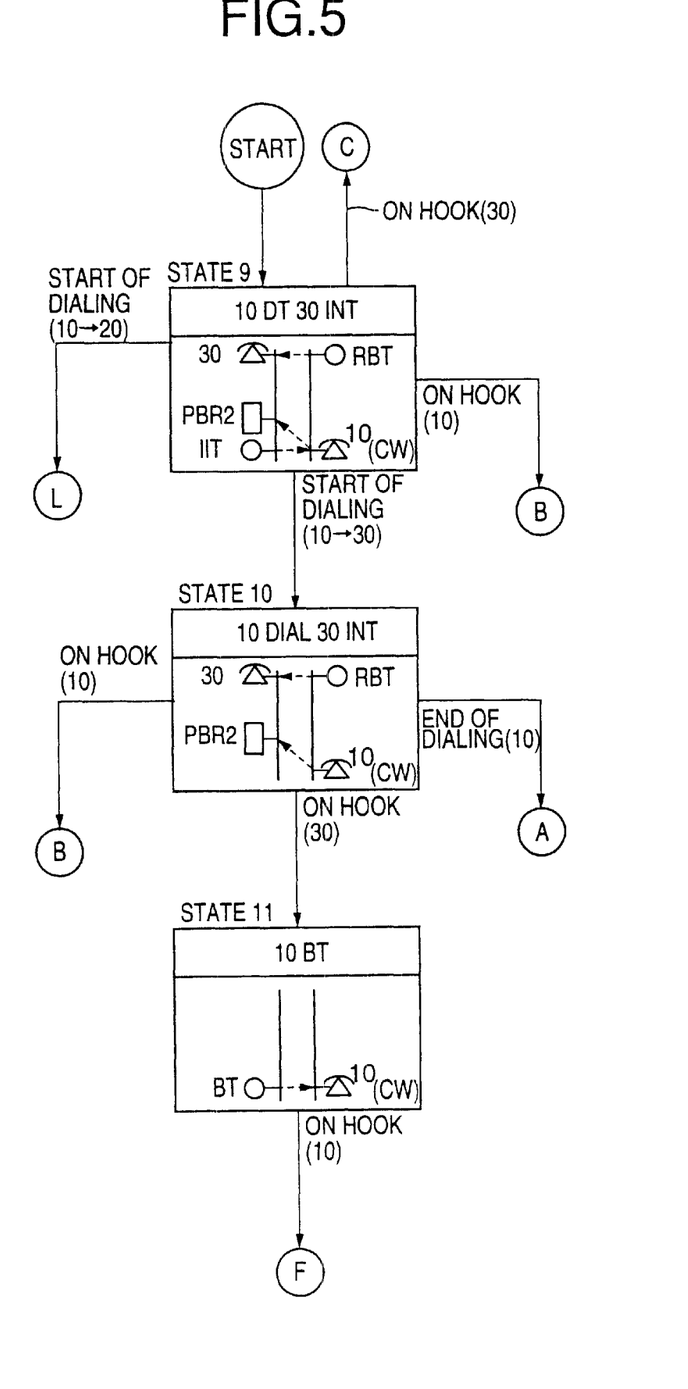
FIG. 5 is a diagram for explaining a state transition of the switching system of the present embodiment after the execution of the call waiting process.

Referring back to FIG. 4, when the C/O exchange 60 is in the state 6 and the merging operation of the call waiting process shown in FIG. 9 is completed, the control of the C/O exchange 60 is transferred to a preparation before the start of state 9 of FIG. 5.

FIG. 5 shows a state transition of the switching system of the present embodiment after the execution of the call waiting process. Specifically, a call control processing and a state transition of the C/O exchange 60 when an incoming call from the telephone 30 to the telephone 10 occurs in a state that a dial tone is being sent to the telephone 10 prior to dialing of the phone number of the telephone 20 are illustrated in FIG. 5.

In the preparation before the start of state 9 of FIG. 5, the CPU 21 enables the LC control block 28 to perform the signaling such that the C/O exchange 60 starts sending a ring-back tone (RBT) to the telephone 30, stops sending the dial tone (DT) to the telephone 10 and starts sending an audible interrupt signal (IIT) to the telephone 10. This interrupt signal (IIT) enables the telephone 10 to notify its user of the incoming call from the telephone 30.

In the state 9 of FIG. 5, the interrupt signal (IIT) is being sent to the telephone 10, and the ring-back tone (RBT) is being sent to the telephone 30. When dialing of a predetermined number (the first digit of which is, for example, "*") for accepting the incoming call is started on the telephone 10 with the C/O exchange 60 being in the state 9, the CPU 21 enables the DN checking block 27 to recognize that the key-input first-digit data "*" which is dialed on the telephone 10 indicates the user's acceptance to the incoming call. In this case, the CPU 21 enables the LC control block 28 to perform the signaling such that the C/O exchange 60 stops sending the interrupt signal IIT to the telephone 10. The control of the C/O exchange 60 is transferred to state 10 of FIG. 5.

If the telephone 10 is placed in an on-hook condition with the exchange 60 being in the state 9 of FIG. 5, the CPU 21 enables the LC control block 28 to perform the signaling such that the exchange 60 stops sending the interrupt signal IIT to the telephone 10, disconnects the push-button receiver PBR2 from the telephone 10, and starts sending a ringing tone (RGT) to the telephone 10. The control of the exchange 60 is transferred to state 18 of FIG. 7.

Further, if the telephone 30 is placed in an on-hook condition with the exchange 60 being in the state 9 of FIG. 5, the CPU 21 enables the LC control block 28 to perform the signaling such that the exchange 60 stops sending the interrupt signal IIT to the telephone 10 and starts sending a dial tone (DT) to the telephone 10. In this case, the CPU 21 enables the CSM PARA setting block 24 to clear or delete the interrupt telephone ID ("30") of the call state management parameter of the memory area 36a. The control of the exchange 60 is transferred to the state 3 of FIG. 4.

Further, if the dialing of the phone number (the first digit is one of the ten keys "0"–"9") of the telephone 20 is started on the telephone 10 with the exchange 60 being in the state 9 of FIG. 5, the CPU 21 enables the DN checking block 27 to recognize that the first-digit data which is dialed on the telephone 10 indicates the user's original intention to call the telephone 20. In this case, the CPU 21 enables the LC control block 28 to perform the signaling such that the exchange 60 stops sending the interrupt signal IIT to the telephone 10. The control of the C/O exchange 60 is transferred to state 12 of FIG. 6.

In the state 10 of FIG. 5, the dialing of the predetermined number for accepting the incoming call is being performed on the telephone 10. When the dialing is successfully completed on the telephone 10, the CPU 21 controls the LC control block 28 such that the exchange 60 stops sending the ring-back tone RBT to the telephone 30, disconnects the push-button receiver PBR2 from the telephone 10, and establishes a connection between the telephone 10 and the telephone 30. The control of the exchange 60 is transferred to state 19 of FIG. 7.

If the telephone 30 is placed in an on-hook condition with the exchange 60 being in the state 10 of FIG. 5, the CPU 21 enables the LC control block 28 to perform the signaling such that the exchange 60 stops sending the ring-back tone RBT to the telephone 30, disconnects the PBR2 from the telephone 10, and starts sending a busy tone (BT) to the telephone 10. In this case, the CPU 21 enables the CSM PARA setting block 24 to clear or delete the interrupt telephone ID ("30") of the call state management parameter of the memory area 36a. The control of the exchange 60 is transferred to state 11 of FIG. 5.

Further, if the telephone 10 is placed in an on-hook condition with the exchange 60 being in the state 10 of FIG. 5, the CPU 21 enables the LC control block 28 to perform the signaling such that the exchange 60 disconnects the PBR2 from the telephone 10, and starts sending a ringing tone (RGT) to the telephone 10. The control of the exchange 60 is transferred to state 18 of FIG. 7.

In the state 11 of FIG. 5, the busy tone BT is being sent to the telephone 10 after the telephone 30 is placed in the on-hook condition. When the telephone 10 is placed in an on-hook condition with the exchange 60 being in the state 11, the CPU 21 enables the LC control block 28 to perform the signaling such that the exchange 60 stops sending the BT to the telephone 10. The CPU 21 enables the CSM PARA releasing block 24 to release the call state management parameter of the memory area 36a. The control of the exchange 60 is transferred to the state 2 of FIG. 4.

Figure 6:
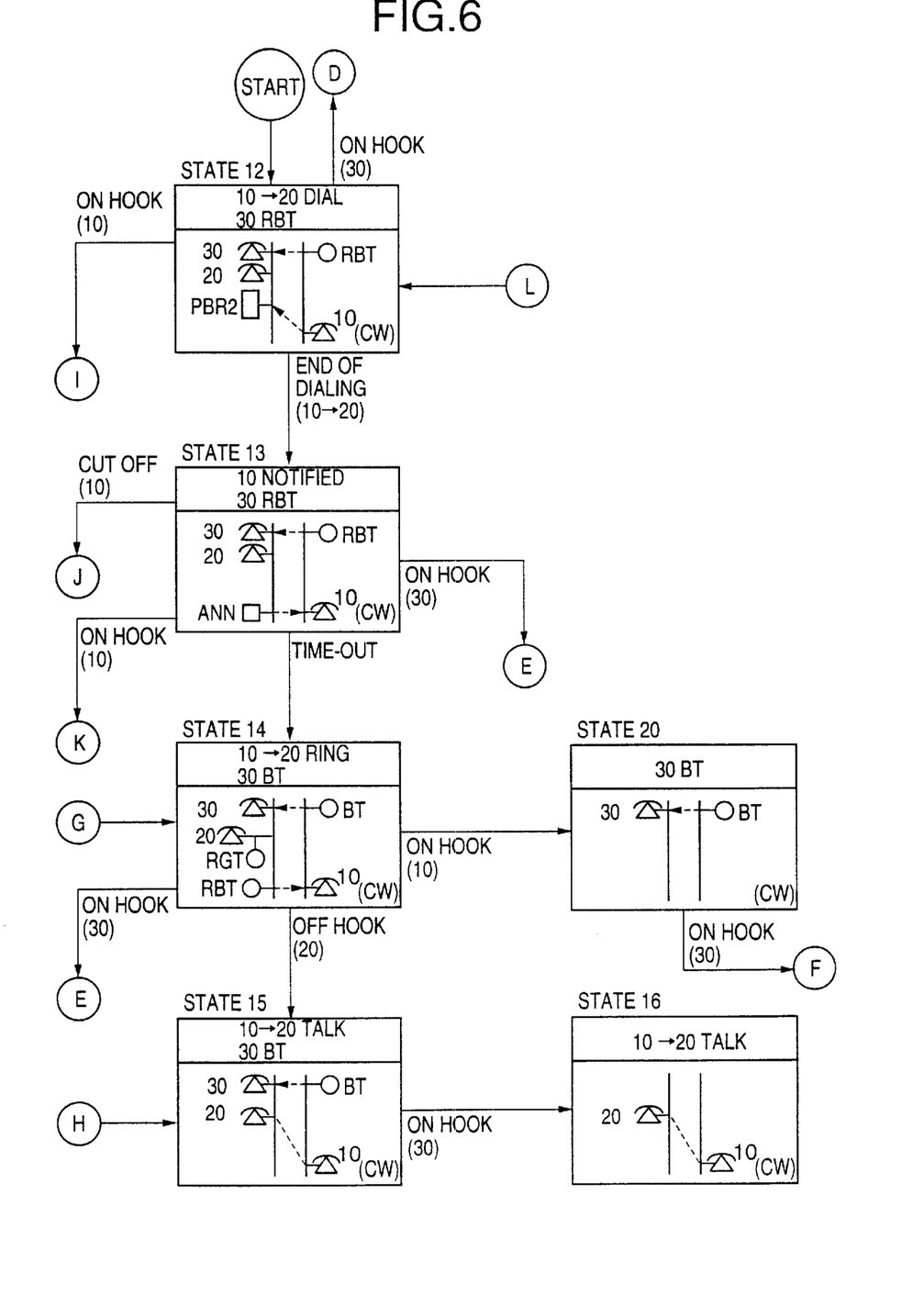
FIG. 6 is a diagram for explaining a state transition of the switching system of the present embodiment after the execution of the call waiting process.

Referring back to FIG. 4, when the exchange 60 is in the state 7 and the merging operation of the call waiting process shown in FIG. 9 is completed, the control of the C/O exchange 60 is transferred to a preparation before the start of state 12 of FIG. 6.

FIG. 6 shows a state transition of the switching system of the present embodiment after the execution of the call waiting process. Specifically, a call control processing and a state transition of the C/O exchange 60 when an incoming call from the telephone 30 to the telephone 10 occurs in a state that the phone number of the telephone 20 is being dialed on the telephone 10 are illustrated in FIG. 6.

In the preparation before the start of state 12 of FIG. 6, the CPU 21 controls the LC control block 28 such that the exchange 60 starts sending a ring-back tone (RBT) to the telephone 30.

In the state 12 of FIG. 6, the dialing of the phone number of the telephone 20 is being performed on the telephone 10 while the RBT is being sent to the telephone 30. When the dialing for calling the telephone 20 is successfully completed on the telephone 20, the CPU 21 controls the LC control block 28 such that the exchange 60 starts sending the notification of the incoming call (from the telephone 30) to the telephone 10 by capturing the announcement message in the memory 31. In this case, the CPU 21 captures a timer which counts the time of the announcement message sending, and starts the timer to count the sending time. Further, the CPU 21 controls the CSM PARA setting block 24 such that the identification of the captured announcement message is inserted in the call state management parameter of the memory area 36a. The control of the exchange 60 is transferred to state 13 of FIG. 6.

If the telephone 10 is placed in an on-hook condition with the exchange 60 being in the state 12 of FIG. 6, the CPU 21 enables the LC control block 28 to perform the signaling such that the exchange 60 disconnects the push-button receiver PBR2 from the telephone 10, and starts sending a ringing tone (RGT) to the telephone 10. The control of the exchange 60 is transferred to the state 18 of FIG. 7.

Further, if the telephone 30 is placed in an on-hook condition with the exchange 30 being in the state 12 of FIG. 6, the CPU 21 enables the LC control block 28 to perform the signaling such that the exchange 60 stops sending the RBT to the telephone 30. The CPU 21 enables the CSM PARA releasing block 24 to clear or delete the interrupt telephone ID "30" of the call state management parameter of the memory area 36a. The control of the exchange 60 is transferred to the state 4 of FIG. 4.

In the state 13 of FIG. 6, the notification of the incoming call to the telephone 10 by sending the announcement message is being performed. When a time-out event of the sending time occurs, the CPU 21 enables the LC control block 28 to perform the signaling such that the exchange 60 starts sending a busy tone (BT) to the telephone 30, stops sending the announcement message to the telephone 10, starts sending a ring-back tone (RBT) to the telephone 10, and starts sending a ringing tone (RGT) to the telephone 20. The control of the exchange 60 is transferred to state 14 of FIG. 6.

If the user of the telephone 10 cuts off the call (from the telephone 20) with the exchange 60 being in the state 13 of FIG. 6, the CPU 21 enables the LC control block 28 to perform the signaling such that the exchange 60 stops sending the announcement message to the telephone 10, and starts sending a ringing tone (RGT) to the telephone 10. The CPU 21 enables the CSM PARA setting block 24 to clear or delete the called telephone ID (in this case, "20") of the call state management parameter of the memory area 36a. The control of the exchange 60 is transferred to state 18 of FIG. 7.

If the telephone 10 is placed in an on-hook condition with the exchange 60 being in the state 13 of FIG. 6, the CPU 21 enables the LC control block 28 to perform the signaling such that the exchange 60 stops sending the RBT to the telephone 30, stops sending the announcement message to the telephone 10, and establishes a connection between the telephone 10 and the telephone 30. The CPU 21 enables the CSM PARA setting block 24 to clear or delete the called telephone ID (in this case, "20") of the call state management parameter of the memory area 36a. The control of the exchange 60 is transferred to state 19 of FIG. 7.

If the telephone 30 is placed in an onhook condition with the exchange 60 being in the state 13 of FIG. 6, the CPU 21 enables the LC control block 28 to perform the signaling such that the exchange 60 stops sending the RBT to the telephone 30, stops sending the announcement message to the telephone 10, starts sending a ring-back tone (RBT) to the telephone 10, and starts sending a ringing tone (RGT) to the telephone 20. The CPU 21 enables the CSM PARA setting block 24 to clear or delete the interrupt telephone ID and the announcement message ID of,the call state management parameter of the memory area 36a. The control of the exchange 60 is transferred to the state 5 of FIG. 4.

In the state 14 of FIG. 6, the incoming call from the telephone 30 is rejected and the BT is being sent to the telephone 30 since the time-out event occurs on the telephone 10. When the telephone 20 is placed in an off-hook condition with the exchange 60 being in the state 14, the CPU 21 enables the LC control block 28 to perform the signaling such that the exchange 60 stops sending the RGT to the telephone 20, stops sending the RBT to the telephone 10, and establishes a connection between the telephone 10 and the telephone 20. The control of the exchange 60 is transferred to state 15 of FIG. 6.

If the telephone 30 is placed in an on-hook condition with the exchange 60 being in the state 14 of FIG. 6, the CPU 21 enables the LC control block 28 to perform the signaling such that the exchange 60 stops sending the BT to the telephone 30. The CPU 21 enables the CSM PARA setting block 24 to clear or delete the interrupt telephone ID ("30") of the call state management parameter of the memory area 36a. The control of the exchange 60 is transferred to the state 5 of FIG. 4.

If the telephone 10 is placed in an on-hook condition with the exchange 60 being in the state 14 of FIG. 6, the CPU 21 enables the LC control block 28 to perform the signaling such that the exchange 60 stops sending the RBT to the telephone 10, and stops sending the RGT to the telephone 20. The CPU 21 enables the CSM PARA setting block 24 to clear or delete the calling telephone ID ("10") and the called telephone ID ("20") of the call state management parameter of the memory area 36a. The control of the exchange 60 is transferred to state 20 of FIG. 6. In the state 20, only the busy tone BT is being sent to the telephone 30. When the telephone 30 is placed in an on-hook condition with the exchange 30 being in the state 20 of FIG. 6, all the telephones 10, 20 and 30 are set in idle conditions.

In the state 15 of FIG. 6, the communication or talk between the telephone 10 and the telephone 20 is being performed, and the BT is being sent to the telephone 30 since the incoming call to the telephone 10 is rejected. When the telephone 30 is placed in an on-hook condition with the exchange 60 being in the state 15, the CPU 21 enables the LC control block 28 to perform the signaling such that the exchange 60 stops sending the BT to the telephone 30. The CPU 21 enables the CSM PARA setting block 24 to clear or delete the interrupt telephone ID ("30") of the call state management parameter of the memory area 36a. The control of the exchange 60 is transferred to state 16 of FIG. 6. In the state 16, only the talk between the telephone 10 and the telephone 20 is being performed.

Referring back to FIG. 4, when the exchange 60 is in the state 5, the RGT is being sent to the telephone 20 and the RBT is being sent to the telephone 10. When the incoming call from the telephone 30 to the telephone 10 occurs with the exchange 60 being in the state 5, the control of the exchange 60 is transferred to the state 8 of FIG. 4. When the exchange 60 is in the state 8 and the merging operation of the call waiting process shown in FIG. 9 is completed, the control of the exchange 60 is transferred to a preparation before the start of state 17 of FIG. 7.

Figure 7:
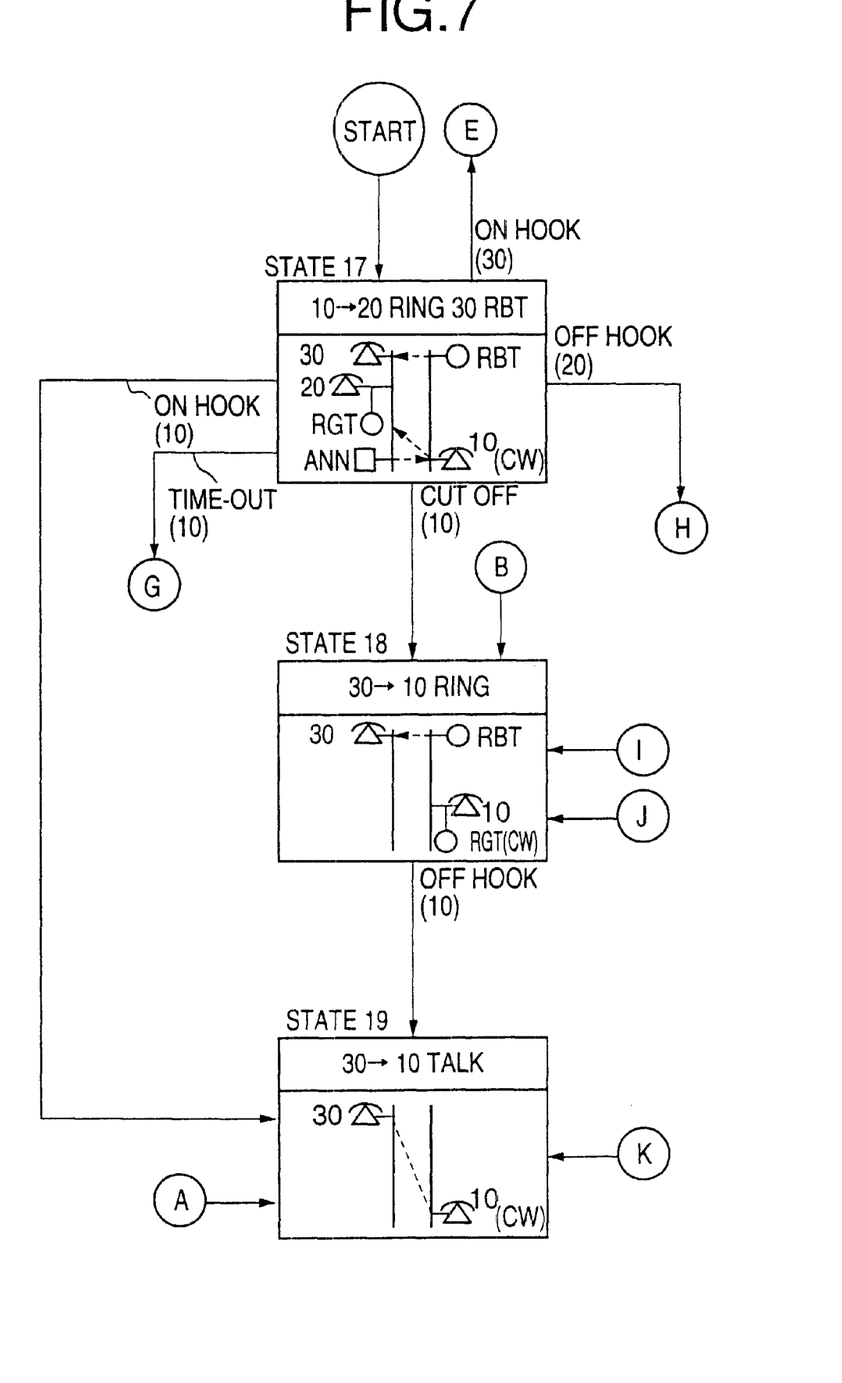
FIG. 7 is a diagram for explaining a state transition of the switching system of the present embodiment after the execution of the call waiting process.

FIG. 7 shows a state transition of the switching system of the present embodiment after the execution of the call waiting process. Specifically, a call control processing and a state transition of the C/O exchange 60 when an incoming call from the telephone 30 to the telephone 10 occurs in a state that a ring-back tone is being sent to the telephone 10 after the phone number of the telephone 20 is dialed on the telephone 10 are illustrated in FIG. 7.

In the preparation before the start of state 17 of FIG. 7, the CPU 21 enables the LC control block 28 to perform the signaling such that the exchange 60 starts sending a ring-back tone (RBT) to the telephone 30, stops sending the ring-back tone RBT to the telephone 10, and starts sending the notification of the incoming call (from the telephone 30) to the telephone 10 by capturing the announcement message in the memory 31. In this case, the CPU 21 captures the timer which counts the time of the announcement message sending, and starts the timer to count the sending time. Further, the CPU 21 controls the CSM PARA setting block 24 such that the identification of the captured announcement message is inserted in the call state management parameter of the memory area 36a. The control of the exchange 60 is transferred to the state 17 of FIG. 7.

In the state 17 of FIG. 7, the RBT is being sent to the telephone 30 and the RGT is being sent to the telephone 20. When the telephone 10 is placed in an on-hook condition with the exchange 60 being in the state 17 of FIG. 7, the CPU 21 enables the LC control block 28 to perform the signaling such that the exchange 60 stops sending the RBT to the telephone 30, stops sending the RGT to the telephone 20, stops sending the notification of the incoming call to the telephone 10, and establishes a connection between the telephone 10 and the telephone 30. The CPU 21 enables the CSM PARA setting block 24 to clear or delete the called telephone ID and the announcement message ID of the call state management parameter of the memory area 36a. The control of the exchange 60 is transferred to the state 19 of FIG. 7.

If the time-out event occurs with the exchange 60 being in the state 17 of FIG. 7, the CPU 21 enables the LC control block 28 to perform the signaling such that the exchange 60 starts sending a ring-back tone (RBT) to the telephone 10, and starts sending a busy tone (BT) to the telephone 30. The CPU 21 enables the CSM PARA setting block 24 to clear or delete the announcement message ID of the call state management parameter of the memory area 36a. The control of the exchange 60 is transferred to the state 14 of FIG. 6.

Further, if the telephone 30 is placed in an on-hook condition with the exchange 60 being in the state 17 of FIG. 7, the CPU 21 enables the LC control block 28 to perform the signaling such that the exchange 60 stops sending the RBT to the telephone 30, stops sending the notification of the incoming call to the telephone 10, and starts sending a ring-back tone (RBT) to the telephone 10. The CPU 21 enables the CSM PARA setting block 24 to clear or delete the interrupt telephone ID and the announcement message ID of the call state management parameter of the memory area 36a. The control of the exchange 60 is transferred to the state 5 of FIG. 4.

Further, if the user of the telephone 10 cuts off the call (from the telephone 20) with the exchange 60 being in the state 17 of FIG. 7, the CPU 21 enables the LC control block 28 to perform the signaling such that the exchange 60 stops sending the RGT to the telephone 20, stops sending the notification of the incoming call to the telephone 10, and starts sending a ringing tone (RGT) to the telephone 10. The CPU 21 enables the CSM PARA setting block 24 to clear or delete the called telephone ID and the announcement message ID of the call state management parameter of the memory area 36a. The control of the exchange 60 is transferred to state 18 of FIG. 7.

Further, if the telephone 20 is placed in an off-hook condition with the exchange 60 being in the state 17 of FIG. 7, the CPU 21 enables the LC control block 28 to perform the signaling such that the exchange 60 stops sending the RBT to the telephone 30, and starts sending a busy tone (BT) to the telephone 30. The CPU 21 enables the LC-control block 28 to perform the signaling such that the exchange 60 stops sending the RGT to the telephone 20, stops sending the notification of the incoming call to the telephone 10, and establishes a connection between the telephone 10 and the telephone 20. The CPU 21 enables the CSM PARA setting block 24 to clear or delete the announcement message ID of the call state management parameter of the memory area 36a. The control of the exchange 60 is transferred to the state 15 of FIG. 6.

In the state 18 of FIG. 7, the ringing tone RGT is being sent to the telephone 10, and the ring-back tone RBT is being sent to the telephone 30. When the telephone 10 is placed in an off-hook condition with the exchange 60 being in the state 18, the CPU 21 enables the LC control block 28 to perform the signaling such that the exchange 60 stops sending the RGT to the telephone 10, stops sending the RBT to the telephone 30, and establishes a connection between the telephone 10 and the telephone 30. The control of the exchange 60 is transferred to the state 19 of FIG. 7. In the state 19 of FIG. 7, only the talk between the telephone 10 and the telephone 30 is being performed.

Figure 8:
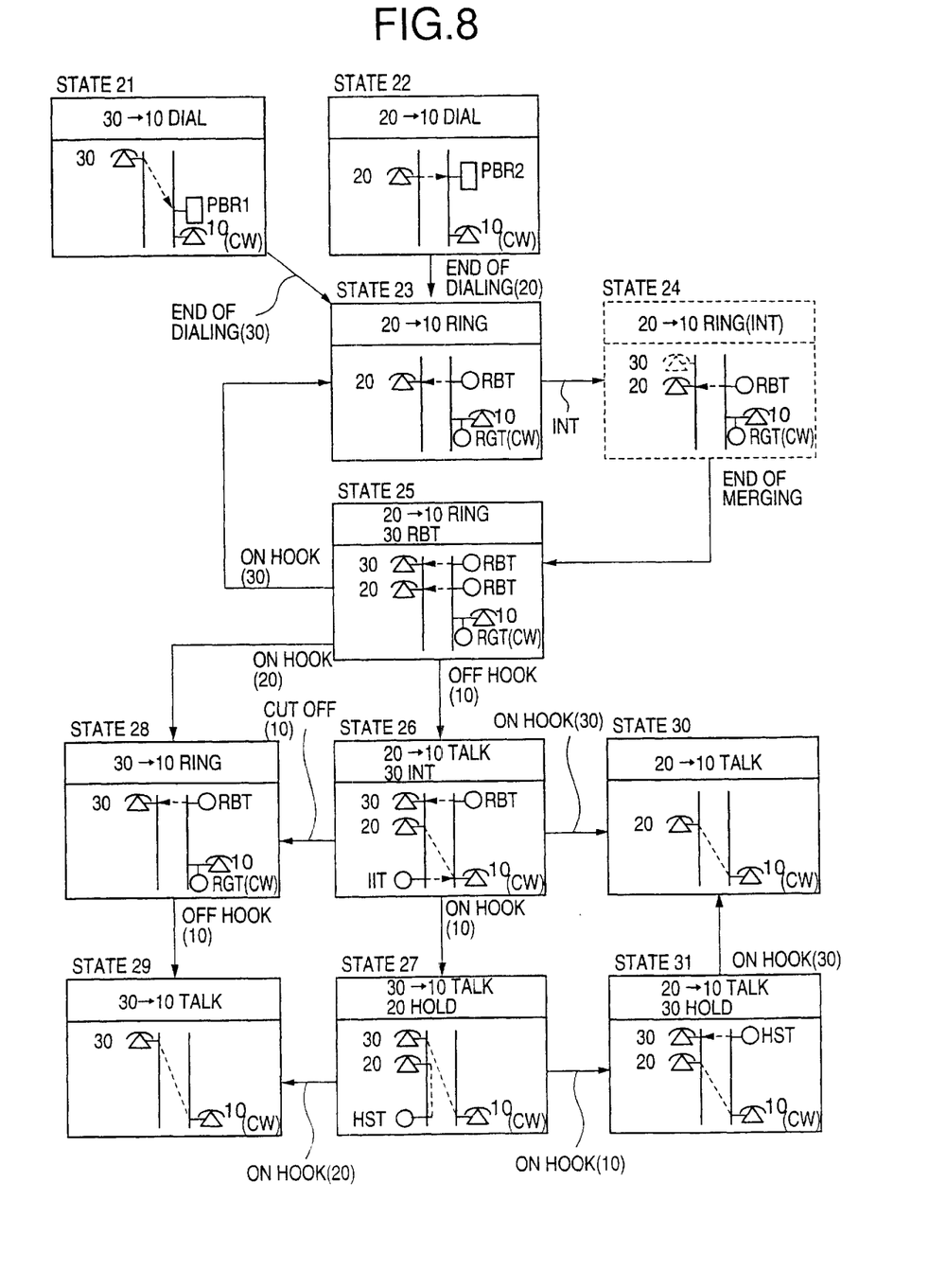
FIG. 8 is a diagram for explaining a state transition of the switching system of the present embodiment when an incoming call from a third telephone to a first telephone occurs in a state that a ringing tone is being sent to the first telephone.

Next, FIG. 8 shows a state transition of the switching system of the present embodiment when an incoming call from the telephone 30 to the telephone 10 occurs in a state that a ringing tone RGT is being sent to the telephone 10 and a ring-back tone RBT is being sent to the telephone 20. Suppose that the supply of the call waiting service for the telephone 10 is already registered in the C/O exchange 60.

In state 22 of FIG. 8, the dialing of the phone number of the telephone 10 is being performed on the telephone 20 in order to call the telephone 10. When the dialing is completed on the telephone 20, the control of the exchange 60 is transferred to state 23. In the state 23, the RGT is being sent to the telephone 10 and the RBT is being sent to the telephone 20.

On the other hand, in state 21 of FIG. 8, the dialing of the phone number of the telephone 10 is being performed on the telephone 30. When the dialing is completed on the telephone 30, an incoming call from the telephone 30 interrupts the state 23 of the exchange 60. The call waiting process of FIG. 9 is performed with the exchange 60 being in the state 23. If the execution of the improved call waiting service of the present invention is possible, the control of the exchange 60 is transferred to state 24 as indicated by the dotted line in FIG. 8.

When the exchange 60 is in the state 24 of FIG. 8 and the merging operation of the call waiting process shown in FIG. 9 is completed, the control of the exchange 60 is transferred to a preparation before the start of state 25 of FIG. 8. In the preparation before the start of the state 25, the CPU 21 enables the LC control block 28 to perform the signaling such that the exchange 60 starts sending a ring-back tone RBT to the telephone 30. After this is done, the control of the exchange 60 is transferred to the state 25.

In the state 25 of FIG. 8, the RGT is being sent to the telephone 10, the RBT is being sent to the telephone 30, and the RBT is being sent to the telephone 20. When the telephone 10 is placed in an off-hook condition with the exchange 60 being in the state 25, the CPU 21 enables the LC control block 28 to perform the signaling such that the exchange 60 stops sending the RBT to the telephone 20, stops sending the RGT to the telephone 10, and establishes a connection between the telephone 10 and the telephone 20. The CPU 21 enables the LC control block 28 to perform the signaling such that the exchange 60 starts sending an audible interrupt signal IIT to the telephone 10. This interrupt signal IIT enables the telephone 10 to notify its user of the incoming call from the telephone 30. The control of the exchange 60 is transferred to state 26 of FIG. 8.

Further, if the telephone 30 is placed in an on-hook condition with the exchange 60 being in the state 25 of FIG. 8, the CPU 21 enables the LC control block 28 to perform the signaling such that the exchange 60 stops sending the RBT to the telephone 30. The CPU U21 enables the CSM PARA setting block 24 to clear or delete the interrupt telephone ID ("30") of the call state management parameter of the memory area 36a. The control of the exchange 60 is transferred back to the state 23.

Further, if the telephone 20 is placed in an on-hook condition with the exchange 60 being in the state 25 of FIG. 8, the CPU 21 enables the LC control block 28 to perform the signaling such that the exchange 60 stops sending the RBT to the telephone 20. The CPU 21 enables the CSM PARA setting block 24 to clear or delete the calling telephone ID ("20") of the call state management parameter of the memory area 36a. The control of the exchange 60 is transferred to state 28 of FIG. 8.

In the state 26 of FIG. 8, the communication or talk between the telephone 10 and the telephone 20 is being performed since the telephone 10 is set in the off-hook condition in response to the ringing tone RGT. At the same time, in the state 26, the interrupt signal IIT is being sent to the telephone 10, and the RBT is being sent to the telephone 30. When the telephone 10 is placed in an on-hook condition with the exchange 60 being in the state 26, the CPU 21 enables the LC control block 28 to perform the signaling such that the exchange 60 starts sending an audible hold state tone (HST) to the telephone 20, stops sending the RBT to the telephone 30, and establishes a connection between the telephone 10 and the telephone 30. The control of the exchange 60 is transferred to state 27 of FIG. 8.

If the user of the telephone 10 cuts off the call (from the telephone 20) with the exchange 60 being in the state 26 of FIG. 8, the CPU 21 enables the LC control block 28 to perform the signaling such that the exchange 60 releases the connection between the telephone 10 and the telephone 20, and stops sending the IIT to the telephone 10. The control of the exchange 60 is transferred to the state 28.

Further, if the telephone 30 is placed in an on-hook condition with the exchange 60 being in the state 26 of FIG. 8, the CPU 21 enables the LC control block 28 to perform the signaling such that the exchange 60 stops sending the RBT to the telephone 30, and stops sending the IIT to the telephone 10. The CPU 21 enables the CSM PARA setting block 24 to clear or delete the interrupt telephone ID ("30") of the call state parameter of the memory area 36a. The control of the exchange 60 is transferred to state 30 of FIG. 8.

In the state 27 of FIG. 8, the communication or talk between the telephone 10 and the telephone 30 is being performed, and the HST is being sent to the telephone 20. When the telephone 20 is placed in an on-hook condition with the exchange 60 being in the state 27, the CPU 21 enables the LC control block 28 to perform the signaling such that the exchange 60 stops sending the HST to the telephone 20. The CPU 21 enables the CSM PARA setting block 24 to clear or delete the calling telephone ID of the call state management parameter of the memory area 36a. The control of the exchange 60 is transferred to state 29 of FIG. 8.

If the telephone 10 is placed in an onhook condition with the exchange 60 being in the state 27 of FIG. 8, the CPU 21 enables the LC control block to perform the signaling such that the exchange 60 releases the connection between the telephone 10 and the telephone 30, starts sending a hold state tone HST to the telephone 30, and establishes a connection between the telephone 10 and the telephone 20. The control of the exchange 60 is transferred to state 31 of FIG. 8.

In the state 28 of FIG. 8, the RBT is being sent to the telephone 30, and the RGT is being sent to the telephone 10. When the telephone 10 is placed in an off-hook condition in response to the RGT with the exchange 60 being in the state 28, the CPU 21 enables the LC control block 28 to perform the signaling such that the exchange stops sending the RGT to the telephone 10, stops sending the RBT to the telephone 10, and establishes a connection between the telephone 10 and the telephone 30. The control of the exchange 60 is transferred to the state 29 of FIG. 8.

In the state 31 of FIG. 8, the communication or talk between the telephone 10 and the telephone 20 is being performed, and the HST is being sent to the telephone 30. When the telephone 30 is placed in an on-hook condition with the exchange 60 being in the state 31, the CPU 21 enables the LC control block 28 to perform the signaling such that the exchange 60 stops sending the HST to the telephone 30. The CPU 21 enables the CSM PARA setting block 24 to clear or delete the interrupt telephone ID ("30") of the call state management parameter of the memory area 36a. The control of the exchange 60 is transferred to the state 30 of FIG. 8. In the state of FIG. 8, only the talk between the telephone 10 and the telephone 20 is being performed.

In the above-described embodiment, the switching system of the present invention is applied to the C/O exchange 60 and the telephones 10, 20 and 30 locally interconnected by the C/O exchange 60. However, it is also possible to apply the switching system of the present invention to the C/O exchange 60 and the telephones 10, 40 and 50 (which are linked via the C/O exchange 70 and the PBX 80) without departing from the scope of the present invention.

In the above-described embodiment, the switching system of the present invention is applied to the central office exchange 60. However, it is also possible to apply the switching system of the present invention to the private branch exchange 80 in a similar manner. Further, in the above-described embodiment, the fixed telephones 10–50 are interconnected by a central office exchange. However, in the switching system of the present invention, personal handy-phone systems (PHS) or cellular mobile telephones may be used instead without departing from the scope of the present invention.

The present invention is not limited to the above-described embodiment, and variations and modifications may be made without departing from the scope of the present invention.

Further, the present invention is based on Japanese priority application No. 11-011,095, filed on Jan. 19, 1999, the entire contents of which are hereby incorporated by reference.

What is claimed is:

1. A switching system which interconnects a first telephone, a second telephone and a third telephone through circuit switching, comprising:
   an interrupt notification unit which enables the first telephone, when a dial tone is being sent to the first telephone prior to dialing of a phone number of the second telephone, to notify its user of an incoming call from the third telephone; and
   an interrupt call control unit which enables a connection between the first telephone and the third telephone to be established when a predetermined number for accepting the incoming call is dialed on the first telephone after the notification of the incoming call.

2. The switching system of claim 1, wherein the interrupt call control unit sends a ringing tone to the first telephone when the first telephone is placed in an on-hook condition during or after the notification of the incoming call, the interrupt call control unit enabling the connection between the first telephone and the third telephone to be established when the first telephone is placed in an off-hook condition in response to the ringing tone.

3. The switching system of claim 1, wherein the interrupt call control unit sends a dial tone to the first telephone when the third telephone is placed in an on-hook condition during or after the notification of the incoming call, allowing the user to dial the phone number of the second telephone on the first telephone.

4. The switching system of claim 1, wherein the interrupt call control unit sends a reject signal to the third telephone when the dialing of the phone number of the second telephone is done on the first telephone after the notification of the incoming call, and the interrupt call control unit sending a ringing tone to the second telephone, which causes the second telephone to ring.

5. The switching system of claim 1, wherein the interrupt call control unit sends a ringing tone to the first telephone when the first telephone is placed in an on-hook condition during or after the dialing of the phone number of the second telephone which is done on the first telephone after the notification of the incoming call, the interrupt call control unit enabling the connection between the first telephone and the third telephone to be established when the first telephone is placed in an off-hook condition in response to the ringing tone.

6. The switching system of claim 1, wherein the interrupt call control unit sends a ringing tone to the first telephone when the first telephone is placed in an on-hook condition during or after the dialing of the predetermined number, the interrupt call control unit enabling the connection between the first telephone and the third telephone to be established when the first telephone is placed in an off-hook condition in response to the ringing tone.

7. A switching system which interconnects a first telephone, a second telephone and a third telephone through circuit switching, comprising:
   an interrupt notification unit which enables the first telephone, when a phone number of the second telephone is being dialed on the first telephone, to notify its user, at an end of the dialing, of an incoming call from the third telephone; and
   an interrupt call control unit which enables a connection between the first telephone and the third telephone to be established when the first telephone is placed in an on-hook condition after the notification of the incoming call.

8. The switching system of claim 7, wherein the interrupt call control unit sends a ringing tone to the first telephone when the first telephone is placed in an on-hook condition during or after the notification of the incoming call, the interrupt call control unit enabling the connection between the first telephone and the third telephone to be established when the first telephone is placed in an off-hook condition in response to the ringing tone.

9. The switching system of claim 7, wherein the interrupt call control unit sends a reject signal to the third telephone when a time-out event occurs on the first telephone during or after the notification of the incoming call, and the interrupt call control unit sending a ringing tone to the second telephone, which causes the second telephone to ring.

10. A switching system which interconnects a first telephone, a second telephone and a third telephone through circuit switching, comprising:

an interrupt notification unit which enables the first telephone, when a ring-back tone is being sent to the first telephone after a phone number of the second telephone is dialed on the first telephone, to notify its user of an incoming call from the third telephone; and an interrupt call control unit which enables a connection between the first telephone and the third telephone to be established when the first telephone is placed in an on-hook condition after the notification of the incoming call.

11. The switching system of claim 10, wherein the interrupt call control unit sends a reject signal to the third telephone when a time-out event occurs on the first telephone during or after the notification of the incoming call, and the interrupt call control unit sending a ringing tone to the second telephone, which causes the second telephone to ring.

12. The switching system of claim 10, wherein the interrupt call control unit stops sending a ringing tone to the second telephone when the first telephone is placed in an on-hook condition during the sending of the ring-back tone to the first telephone, and the interrupt call control unit subsequently sending a ringing tone to the first telephone, which causes the first telephone to ring.

13. A switching system which interconnects a first telephone, a second telephone and a third telephone through circuit switching, comprising:

an interrupt detection unit which detects an incoming call from the third telephone to the first telephone when a ringing tone is being sent to the first telephone while a ring-back tone is being sent to the second telephone after a phone number of the first telephone is dialed on the second telephone; and an interrupt notification unit which enables the first telephone, which is active in a communication with the second telephone by placing the first telephone into an off-hook condition in response to the ringing tone, to notify its user, at a start of the communication, of the incoming call from the third telephone.

14. The switching system of claim 13, further comprising an interrupt call control unit which subsequently sends a second ringing tone to the first telephone after either the first telephone or the second telephone is placed in an on-hook condition at an end of the communication, the interrupt call control unit enabling a connection between the first telephone and the third telephone to be established when the first telephone is placed in an off-hook condition in response to the second ringing tone.

* * * * *